US010531490B2

(12) United States Patent
Amiri et al.

(10) Patent No.: US 10,531,490 B2
(45) Date of Patent: *Jan. 7, 2020

(54) WAP SUPPORTING COMPLEMENTARY SUBNETS IN A WLAN

(71) Applicant: Quantenna Communications, Inc., San Jose, CA (US)

(72) Inventors: Bahador Amiri, Saratoga, CA (US); Hossein Dehghan, Diablo, CA (US); Qasem Aldrubi, Fremont, CA (US); Sam Heidari, Los Altos Hills, CA (US)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,968

(22) Filed: Apr. 29, 2018

(65) Prior Publication Data

US 2018/0249506 A1 Aug. 30, 2018

Related U.S. Application Data

(63) Continuation-in-part of application No. 14/740,536, filed on Jun. 16, 2015, now Pat. No. 9,992,795, which
(Continued)

(51) Int. Cl.
*H04W 74/08* (2009.01)
*H04B 7/0452* (2017.01)
(Continued)

(52) U.S. Cl.
CPC ...... *H04W 74/0816* (2013.01); *H04B 7/0452* (2013.01); *H04L 27/2601* (2013.01); *H04W 84/12* (2013.01); *H04W 88/08* (2013.01)

(58) Field of Classification Search
CPC . H04W 74/08; H04W 74/0816; H04W 84/12; H04W 88/08; H04W 88/10; H04L 5/00; H04L 27/2601; H04B 7/0452
See application file for complete search history.

(56) References Cited

U.S. PATENT DOCUMENTS 9,992,795 B1 * 6/2018 Amiri ................ H04L 27/2601
2016/0044513 A1 * 2/2016 Hamdi ................ H04W 24/02
726/3

* cited by examiner

*Primary Examiner* — Mohamed A Kamara
(74) *Attorney, Agent, or Firm* — Maschoff Brennan

(57) ABSTRACT

A wireless access point (WAP) including: antennas, shared and discrete components forming transmit and receive chains coupled to the antenna for orthogonal frequency division multiplexed (OFDM) multiple-input multiple-output (MIMO) WLAN communications with wireless stations. The station set identifier identifies any legacy stations that do not support multi-user (MU) MIMO concurrent downlinks from the WAP, and a number of WLAN subnets for concurrent downlinks communications thereto. The subnet controller generates the WLAN subnets each having a discrete beacon channel together with a discrete medium access control (MAC) for collision sense multiple access (CSMA) uplinks from associated stations to the WAP, and concurrent downlinks from the WAP including concurrent downlinks to legacy stations associated with different subnets; and the subnet controller configured to inject virtual access control indicia into each of the subnets to control uplinks from legacy stations on each of the subnets to the WAP.

10 Claims, 7 Drawing Sheets

Related U.S. Application Data is a continuation-in-part of application No. 14/229,833, filed on Mar. 28, 2014, now Pat. No. 9,088,962.

(60) Provisional application No. 61/806,332, filed on Mar. 28, 2013.

(51) Int. Cl.
*H04L 27/26* (2006.01)
*H04W 84/12* (2009.01)
*H04W 88/08* (2009.01)

PRIOR ART

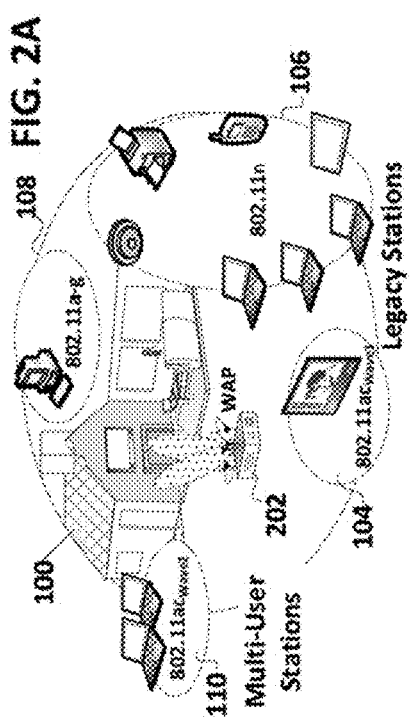
FIG. 2A
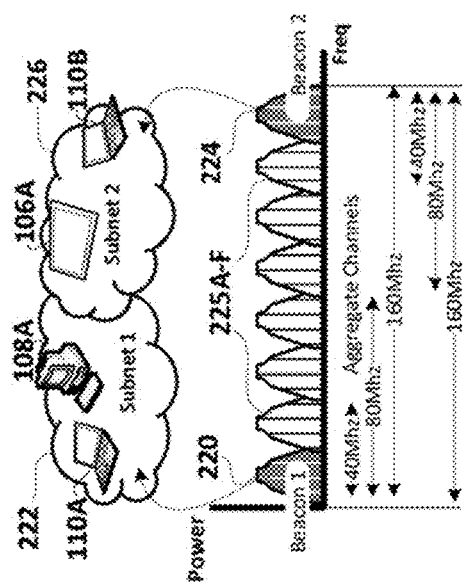
FIG. 2B
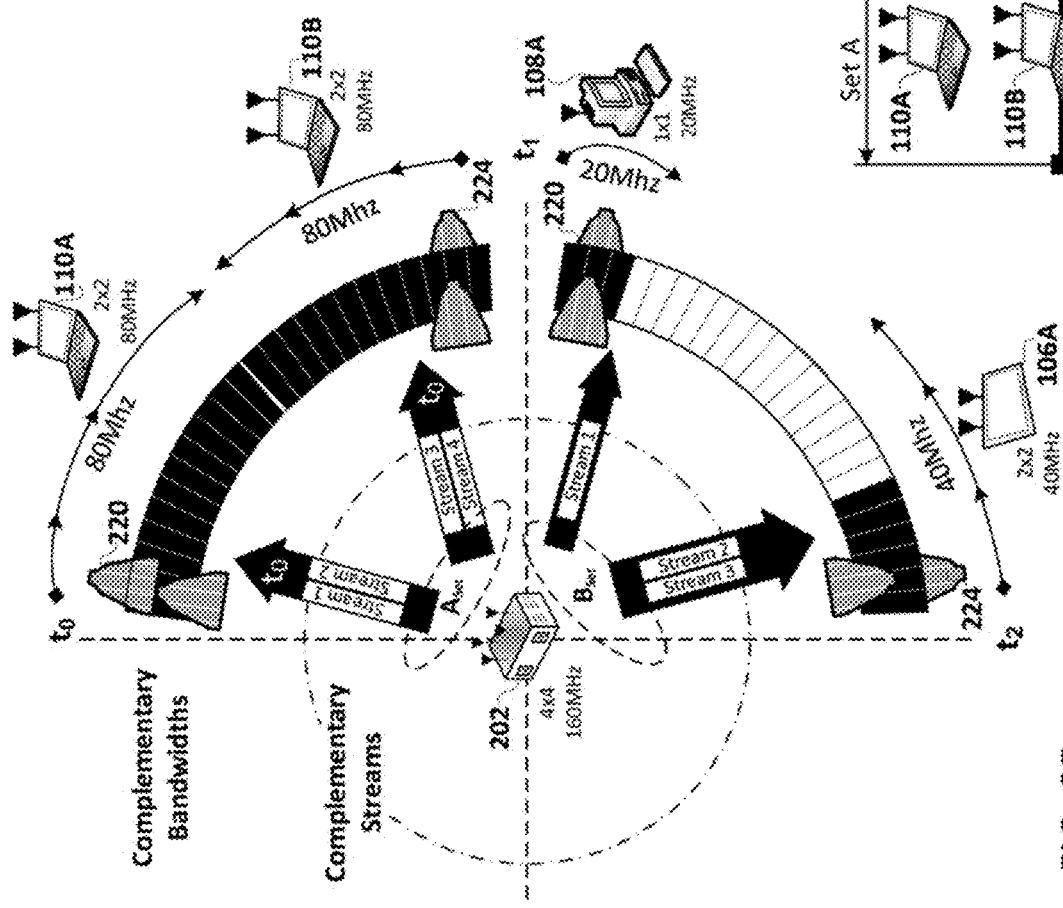
FIG. 2C
FIG. 2D

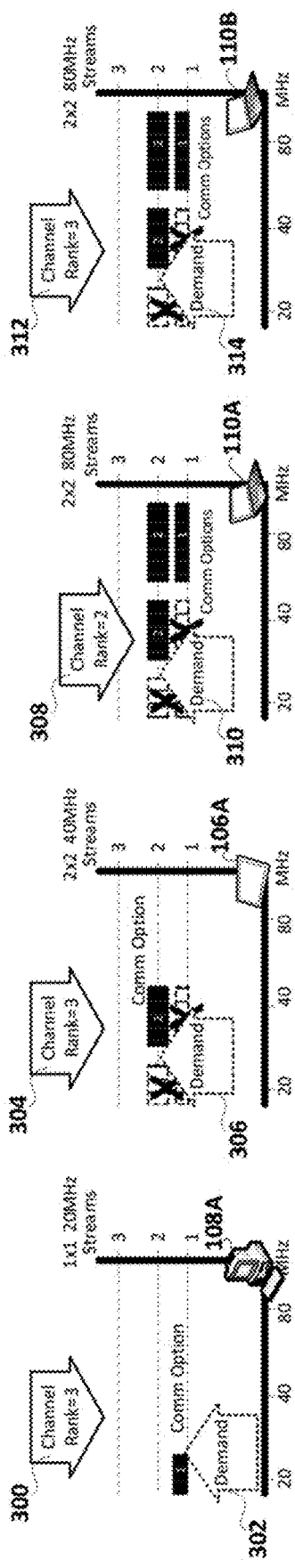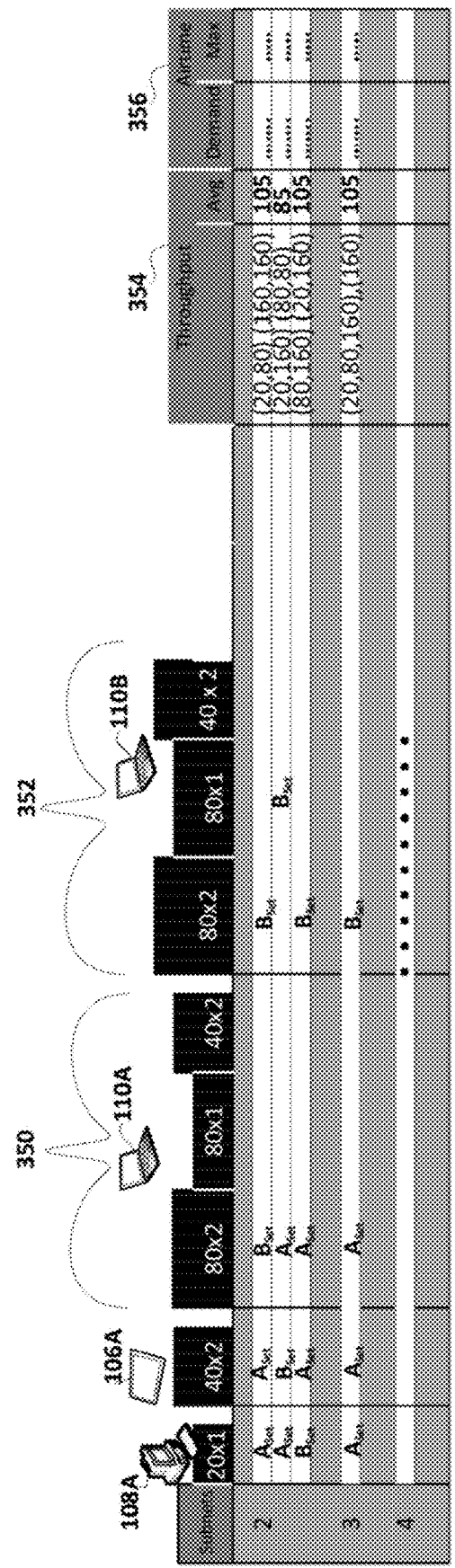

PRIOR ART Multi-User MIMO

SISO/MIMO WAP with Complementary Sub-Nets

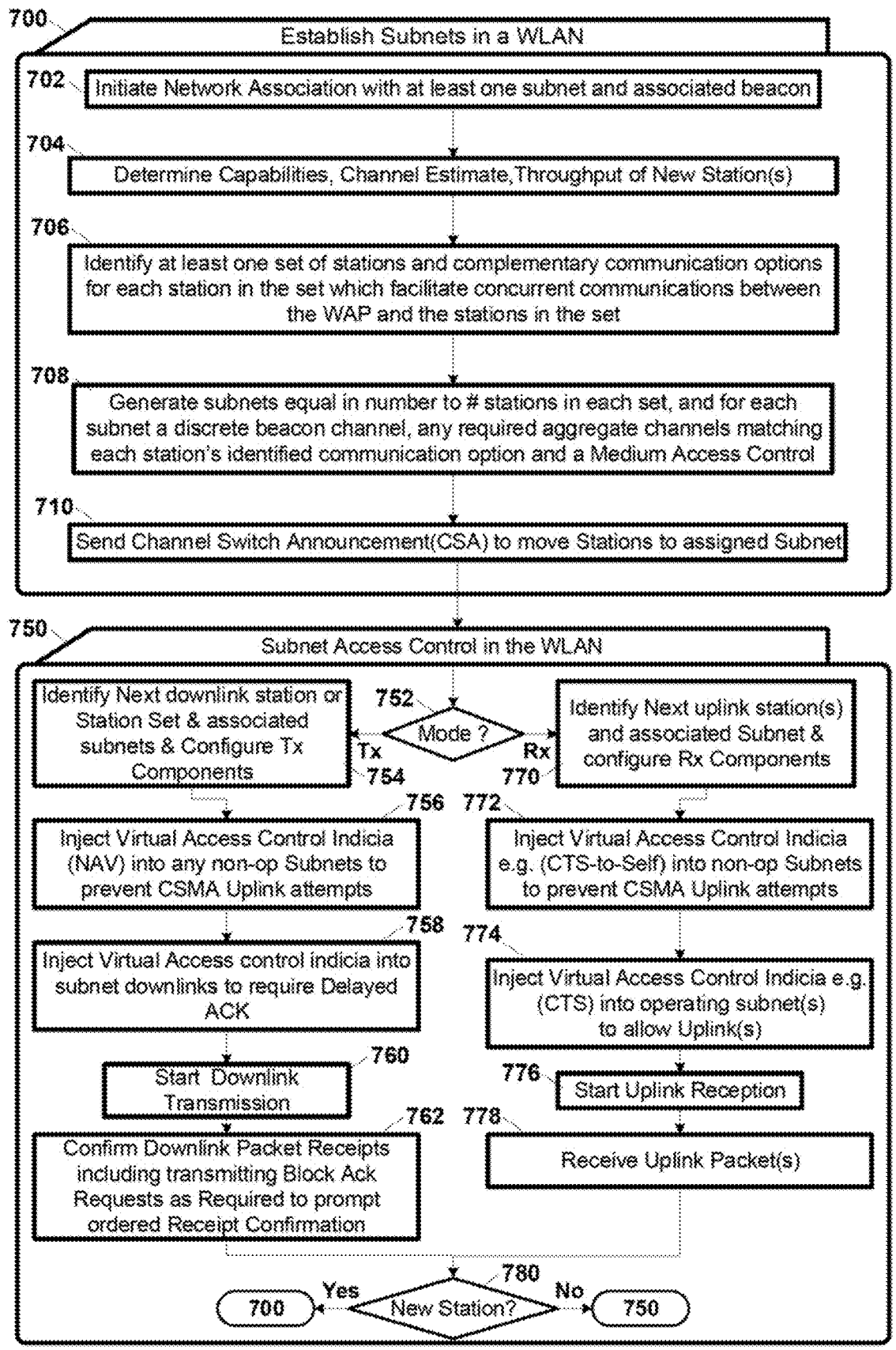
Operating Multiple Subnets on a WLAN  FIG. 7

WAP SUPPORTING COMPLEMENTARY SUBNETS IN A WLAN

CROSS REFERENCE TO RELATED APPLICATION

This application is a continuation in part of prior filed U.S. Utility patent application Ser. No. 14/740,536 Filed Jun. 16, 2015, entitled "WAP Supporting Complementary Subnets in a WLAN", which is a continuation in part of prior filed U.S. Utility patent application Ser. No. 14/229,833 Filed Mar. 28, 2014, entitled "WAP Supporting Complementary Subnets in a WLAN" Issued as U.S. Pat. No. 9,088,962 on Jul. 21, 2015, which in turn claims the benefit of prior filed Provisional Application No. 61/806,332 filed on Mar. 28, 2013 entitled "Adaptive Controller Design for Multiple Radio Frequency Transceivers" all of which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and methods of multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers, tablets and other high throughput wireless devices the communication capabilities of which rival those of the WAP.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality.

What is needed are improved methods for multi-user communication on the wireless home network.

SUMMARY OF THE INVENTION

The present invention provides a method and apparatus for a wireless access point (WAP) apparatus which supports concurrent communications with all IEEE 802.11 stations including those that do not support multi-input multi-output (MIMO) communications or multi-user (MU) MIMO communications.

In an embodiment of the invention a wireless communication apparatus for providing a wireless local area network (WLAN) to a plurality of wireless stations is disclosed. The wireless communication apparatus includes: a wireless access point (WAP). The WAP includes: a plurality of antenna, a plurality of shared and discrete components, a station set identifier and a subnet controller. The plurality of shared and discrete components are coupled to one another to form transmit and receive chains each coupled to a corresponding one of the plurality of antenna for orthogonal frequency division multiplexed (OFDM) multiple-input multiple-output (MIMO) WLAN communications with the plurality of wireless stations. The station set identifier is configured to identify among the plurality of stations, any legacy stations that do not support multi-user (MU) MIMO concurrent downlinks from the WAP, and to identify a number of WLAN subnets for enabling concurrent downlinks from the WAP to the legacy stations. The subnet controller is coupled to the plurality of shared and discrete components and to the station set identifier and configured to generate the number of WLAN subnets identified by the station set identifier and for each subnet a discrete beacon channel for wireless station association and communication together with a discrete medium access control (MAC) for collision sense multiple access (CSMA) uplinks from associated ones of the plurality of stations to the WAP, and concurrent downlinks of discrete communications from the WAP including concurrent downlinks to a selected one of the legacy stations associated with a first of the subnets and to a selected other of the legacy stations associated with a second of the subnets; and the subnet controller configured to inject virtual access control indicia into each of the subnets to control uplinks from legacy stations on each of the subnets to the WAP.

The invention may be implemented in hardware, firmware, or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A-D are respectively a system view, a bandplan, a timing diagram, and a time sequenced bandplan of a WLAN in accordance with an embodiment of the invention which expands the types of stations which can be concurrently communicated with in accordance with and does not required MU-MIMO to do so, in accordance with an embodiment of the invention;

FIGS. 3A-D are graphs showing communication capabilities and communication options for representative stations on the WLAN and FIG. 3E is a table showing various sets of stations and a communication option for each station complementary to the communication options of other stations in the set, and the relative rankings of each set, in accordance with an embodiment of the invention:

FIG. 7 is a process flow diagram of processes associated with a WAP supporting concurrent links to stations without the requirement for MU-MIMO, in accordance with an embodiment of the current invention.

DETAILED DESCRIPTION OF THE EMBODIMENTS

The present invention provides a method and apparatus for increasing communicating with stations concurrently without using the IEEE 802.11ac (Wave 2) MU-MIMO protocol.

MU-MIMO is a technique whereby multiple independent transmissions are sent simultaneously to a number of receiver. The transmissions are precoded in such a way that the respective receive signals are free of mutual interference. Precoding coefficients are chosen in such a way that interference is eliminated at the antennas of the different receivers. Stations eligible for inclusion in a group must support the IEEE 802.11ac (Wave 2) specification, and the MU protocol set forth therein. This constraint severely limits the number of stations which can be included in multi-user groups and excludes billions of existing wireless devices which only support one or more of prior wireless standards, such as: IEEE 802.11 "a", "b", "g", "n" and "ac (Wave 1)".

FIGS. 1A-D are respectively a system view, a bandplan, a timing diagram, and time sequenced bandplan of a Prior Art wireless local area network (WLAN) exhibiting limited support for multi-user (MU) multiple-input multiple-output (MIMO) wireless communications. Prior Art MU MIMO as implemented in the IEEE 802.11ac standard and specifically 'Wave 2' thereof, is intended to enable the WAP to communicate with multiple devices concurrently, thereby increasing the time available for discrete MIMO video links to wireless HDTVs, computers tablets and other high throughput wireless devices the communication capabilities of which rival those of the WAP 102. This prior art case is shown in FIGS. 1A-D.

Figures 1A, 1B, 1C, 1D:
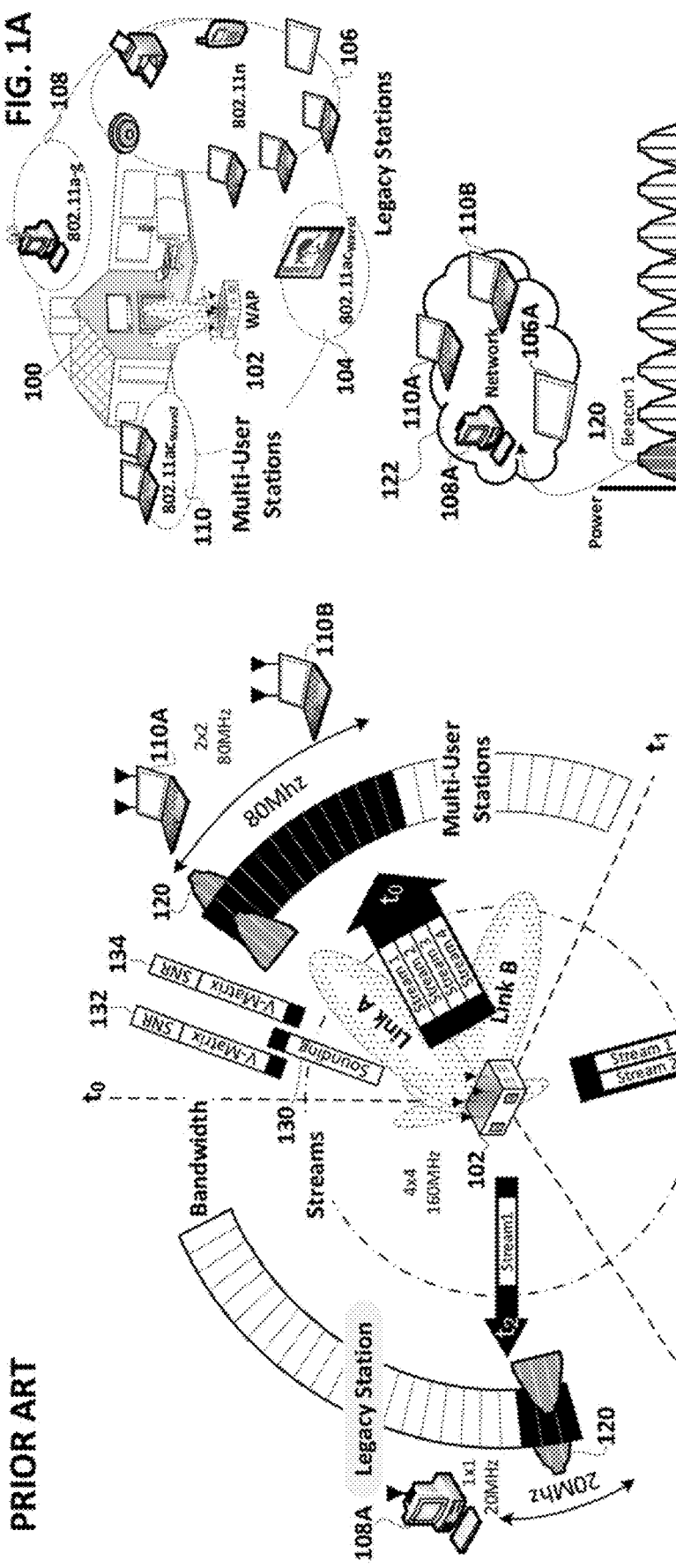
FIGS. 1A-D are respectively a system view, a bandplan, a timing diagram, and a time sequenced bandplan of a Prior Art wireless local area network (WLAN) exhibiting limited support for multi-user (MU) multiple-input multiple-output (MIMO) wireless communications.

FIG. 1A is a system view of WAP 102 servicing multiple wireless devices/stations in a home 100. The WAP is a 4×4 device meaning it has have four antennas and internally supports up to four transport streams. Three types of Legacy stations, i.e. those that do not support the IEEE 802.11ac (Wave 2) standard are shown. The first type of legacy stations 108 are those which only support one or more of the IEEE 802.11 "a", "b" or "g" standards. The second type of legacy stations 106 are those which only support IEEE 802.11 "n" or prior standards. The third type of legacy stations 104 are those which only support IEEE 802.11 "ac" (Wave 1) or prior standards. Although these legacy devices do support broadcast of the same content to multiple recipients, i.e. Multicast transmission, none of them support concurrent discrete transmissions to multiple stations. The only stations 110 that are able to support MU-MIMO are those that are compliant with the IEEE 802.11ac (Wave 2) standard, i.e. stations 110.

FIG. 1B is a bandplan showing a representative portion of an IEEE 802.11ac bandplan with a single beacon channel 120 supporting medium access control (MAC) for all stations 106A, 110A-B and 108A on the WLAN 122. Adjacent aggregate channels all of which include at least the beacon channel may be used as demand requires to expand communications bandwidth beyond the 20 MHz beacon/primary channel to: 40 MHz, 80 MHz or 160 MHz bandwidth communications between the WAP and each station in the WLAN as required.

FIG. 1C is a timing diagram. The stations receiving concurrent or discrete communications from WAP 102 are shown. The WAP uses MU-MIMO precoding to concurrently transmit discrete communications in the same time interval, $t_0$-$t_1$ and shared channel to notebook computers 110A, 110B. Both computers 110A, 110B are compliant with the IEEE 802.11ac (Wave 2) wireless communication standard including support for MU sounding and framing. The prior art WAP 102, lacks support for concurrent communications with legacy devices which do not support the IEEE 802.11ac (Wave 2) standard, and thus communicates serially with these legacy devices. In successive time intervals $t_1$-$t_2$ and $t_2$-$t_3$ the prior art WAP 102 communicates serially with legacy devices 106A, 108A respectively.

As shown in FIG. 1D, 802.11ac (Wave 2) compliant devices 110A-110B can be aggregated into an MU-MIMO group with a concomitant reduction in airtime usage resulting from the ability of the WAP to concurrently rather than serially transmit discrete data to two or more such devices in an MU group. The notebook computers 110A, 110B in the MU-MIMO group serviced in time interval $t_0$-$t_1$ are shown as 2×2 devices meaning they have two antennas and internally support up to two transport streams. Each is shown as having the same maximum bandwidth, e.g. 80 MHz and the same beacon channel 120. Any devices participating in a prior art MU-MIMO group are subject to an initial MU channel sounding 130 from the WAP and responses 132-134 from each targeted user device in which indicia for the associated channel are returned, i.e. the $V^H$ matrix and Signal-to-Noise Ratios (SNR).

In the event stations in a prior art MU-MIMO group did not have matching bandwidths, the bandwidth, under the IEEE 802.11ac (Wave2) standard is limited to that of the group member with the narrowest bandwidth. In other words, if one MU-MIMO group member supported 20 MHz and the others 160 MHz the maximum bandwidth for MU-MIMO under the IEEE 802.11ac (Wave2) standard would be 20 MHz because the MU Frame header specified in that standard only has one bandwidth field for indicating the common bandwidth to all stations in the MU-MIMO group.

In the example shown in FIG. 1D, communications to legacy stations 106A and 108A can not take place concurrently due to the lack of support for the IEEE 802.11ac (Wave2) MU-MIMO protocol. Thus they are communicated with sequentially in time intervals $t_1$-$t_2$ and $t_2$-$t_3$ respectively rather than concurrently. Communications with legacy station 106A in time in interval $t_1$-$t_2$ spans 40 MHz using two transport streams which is the maximum bandwidth for legacy station 106A. Communications with legacy station 108A in time in interval $t_2$-$t_3$ spans 20 MHz using one transport stream which is the maximum bandwidth for legacy station 108A.

FIGS. 2A-D are respectively a system view, a bandplan, a timing diagram, and a time sequenced bandplan of a WLAN in accordance with an embodiment of the invention which expands the types of stations which can be concurrently communicated with in accordance with and does not required MU-MIMO to do so, in accordance with an embodiment of the invention;

FIG. 2A is a system view of WAP 202 servicing multiple wireless devices/stations in a home 100. The WAP is a 4×4 device meaning it has have four antennas and internally supports up to four transport streams over a maximum bandwidth of 160 MHz. Three types of Legacy stations, i.e. those that do not support the IEEE 802.11ac (Wave2) standard, are shown. The first type of legacy stations 108 are those which only support one or more of the IEEE 802.11 "a", "b" or "g" standards. The second type of legacy stations 106 are those which only support IEEE 802.11 "n" or prior standards. The third type of legacy stations 104 are those which only support IEEE 802.11 "ac" (Wave 1) or prior standards. Although these legacy devices do support broadcast of the same content to multiple recipients, i.e. Multicast transmission, none of them support concurrent discrete transmissions to multiple stations. The only stations 110 that are able to support MU-MIMO are those that are compliant with the IEEE 802.11ac (Wave2) standard, i.e. stations 110.

FIG. 2B is a bandplan showing a representative portion of an IEEE 802.11ac bandplan with two beacon channels 220, 224 each supporting a discrete subnet 222 and 226 respectively on the associated one of the beacon channels. In this embodiment of the invention the subnets are allocated overlapping ones of the aggregate channels 225A-F. Each subnet has an associated medium access control (MAC) for the stations. Subnet 222 includes stations 108A and 110A associating with WAP beacon 220 at bandwidths ranging between 20 MHz and 160 MHz using the aggregate of one or more of the adjacent communication channels 225A-F. Subnet 226 includes stations 106A and 110B associating with beacon 224 at bandwidths ranging between 20 MHz and 160 MHz using the aggregate of one or more of the adjacent communication channels 225A-F. Collectively the two subnets comprise the WLAN. These adjacent aggregate channels may be used as demand requires to expand communications bandwidth on either of the subnets beyond the 20 MHz beacon/primary channel assigned to each subnet to: 40 MHz, 80 MHz or 160 MHz bandwidth communications between the WAP and each station in the WLAN as required. Any given one of the aggregate channels 225A-F is only allocated to one subnet at a time, but the allocation of aggregate channels to subnets may change over time, even on a downlink by downlink basis. For example, if one subnet is allocated one of the six aggregate channels for a downlink to an associated legacy station, the other subnet will be allocated no more than the remaining five aggregate channels for a concurrent downlink to one of its associated stations. For the next set of concurrent downlinks to a different set of stations the allocation of aggregate channels may vary depending on the throughput requirements for the target stations. In another embodiment of the invention the subnets will be allocated distinct beacon channels and distinct aggregate channels, that do not overlap with the aggregate channels available to the other subnet.

FIG. 2C is a timing diagram. The stations receiving concurrent or discrete communications from WAP 202 are shown. The WAP 202 uses the two subnets and associated beacons to concurrently transmit discrete communications in the same time interval, $t_0$-$t_1$ to notebook computers 110A, 110B which form the first concurrent transmission 'Set A'. The concurrent downlink communications do not require MU-MIMO, nor the preceding nor channel sharing associated therewith. Rather concurrent communications are handled on discrete subnets each with their own discrete beacon. These concurrent communications are possible regardless of support by the stations, or for that matter the WAP for MU-MIMO. In the next time interval $t_1$-$t_2$ the WAP 202 communicates concurrently with the legacy stations 106A, 108A on their associated discrete subnets. These stations are members of the second concurrent transmission 'Set B' The total time required for the WAP 202 to service all stations on the WLAN and bandwidth available for downlink communications on each subnet are both considerably improved over the prior art case shown in FIGS. 1A-D.

As shown in FIG. 2D, 802.11ac (Wave2) compliant devices 110A-110B form a first transmission set, a.k.a. $A_{set}$ or Set A which is serviced in the first time interval $t_0$-$t_1$. The notebook computers 110A, 110B are each serviced on their own subnets 222, 226 respectively each with a dedicated beacon 220, 224 respectively. Each associated subnet is allocated a discrete 80 MHz bandwidth and a pair of transport streams each for the concurrent downlink from the WAP. No MU-MIMO sounding is required.

In the next time interval the stations forming the second transmission set, a.k.a. $B_{set}$ or Set B, i.e. stations 106A, 108A are serviced concurrently in the second time interval $t_1$-$t_2$. Each is associated with a different beacon and associated subnet. Station 108A is associated with beacon 220 and subnet 222. Station 106A is associated with beacon 224 and subnet 226. Each station is allocated their own bandwidth and transport streams, e.g. 20 MHz with one transport stream for the downlink to computer 108A and 40 MHz with two transport streams for the concurrent downlink to tablet 106A. There is no requirement for the lowest common denominator bandwidth as is the case with prior art MU-MIMO.

FIGS. 3A-D are graphs showing communication capabilities and communication options for representative stations on the WLAN. FIG. 3E is a table showing various sets of stations and a communication option for each station complementary to the communication options of other stations in the set, and the relative rankings of each set, in accordance with an embodiment of the invention.

As each station associates with the WAP its communication capabilities are determined, e.g. maximum bandwidth and number of transport streams supported. In an embodiment of the invention the WAP determines the communication channel between itself and each station using either the reverse channel from the station to the WAP, a.k.a. implicit sounding, or by receiving a channel estimate from the station, a.k.a. explicit sounding. Additionally in an embodiment of the invention the data demand, e.g. Mbps, of each station may be estimated, based for example on any one or all of: station capabilities, e.g. number of streams and bandwidth; and data type, e.g. file transfer, audio streaming or video streaming along with any associated quality of service (QOS) requirements. In this embodiment of the invention the WAP determines the normative communication options for each associated station as shown in FIGS. 3A-D and removes selected ones of these options based on channel rank and condition and on estimated demand to determine the actual communication options.

FIGS. 3A-D are graphs with a vertical axis corresponding to the communication transport stream options supported by the corresponding station and a vertical axis corresponding to the communication bandwidth options supported by the corresponding station. FIGS. 3A-D show these communication capabilities for wireless: computer 108A, tablet computer 106A, notebook computer 110A and notebook computer 110B respectively. In FIG. 3A computer 108A has a single communication option comprising a bandwidth of 20 Mhz over a single transport stream. In FIG. 3B tablet computer 106A initially has four communication options, e.g. a single transport stream with a 20 Mhz bandwidth, or a single transport stream with a 40 Mhz bandwidth, or two transport streams with a 20 Mhz bandwidth, or two transport streams with a 40 Mhz bandwidth. In FIG. 3C notebook computer 110A initially has six communication options, e.g. a single transport stream with a 20 Mhz bandwidth, or a single transport stream with a 40 Mhz bandwidth, or a single transport stream with an 80 Mhz bandwidth, or two transport streams with a 20 Mhz bandwidth, or two transport streams with a 40 Mhz bandwidth, or two transport streams with an 80 Mhz bandwidth. Notebook computer 110A shown in FIG. 3D initially has the same communications options as the notebook computer 110A shown in FIG. 3C.

In this embodiment of the invention the WAP adjusts the communication options based on expected or actual communication constraints such as channel rank and condition and estimated demand for each station. In an embodiment of the invention other communication constraints may be considered. These criteria are used to remove some of the normative communication options for each station to reflect the actual communication constraints experienced by each station on the WLAN.

In FIG. 3A the channel 300 estimated between the WAP and station 108A has a rank of 3 which indicates it is uncorrelated enough, e.g. scattered enough to support 3 streams. Since this exceeds the normative stream support on the computer, e.g. 1 stream no adjustment in communication options is called for. Similarly the estimated throughput level, a.k.a. demand 302 of station 108A is low enough so as to be met with the single communication option available, i.e. a single transport stream at 20 Mhz bandwidth.

In FIG. 3B the channel 304 estimated between the WAP and station 106A has a rank of 3 which indicates it will support up to 3 transport streams which exceeds the normative capabilities of the station 106A. Thus no adjustment in communication options is called for. The estimated throughput level, a.k.a. demand 302 of station 106A is high enough so as to eliminate all but one of the normative communication options. The remaining available communication option is two transport streams at 40 Mhz bandwidth.

In FIG. 3C the channel 308 estimated between the WAP and station 110A has a rank of 2 which indicates it will support up to 2 transport streams which matches the normative capabilities of the station 110A. Thus no adjustment in the normative communication options is called for. However, the estimated demand 310 of station 110A is high enough so as to eliminate all but three of the six normative communication options. The remaining three available communication options are: a single transport stream at 80 Mhz bandwidth, or two transport streams at either 40 MHz or 80 Mhz bandwidth.

In FIG. 3D the channel 312 estimated between the WAP and station 110B has a rank of 3 which indicates it will support up to 3 transport streams which exceeds the normative capabilities of the station 110B. Thus no adjustment in the normative communication options is called for. However, the estimated demand 314 of station 110B is high enough so as to eliminate all but three of the six normative communication options. The remaining three available communication options are: a single transport stream at 80 Mhz bandwidth, or two transport streams at either 40 MHz or 80 Mhz bandwidth.

FIG. 3E shows an embodiment of the invention for determining the number of subnets required for optimizing communications to all the associated WLAN stations. FIG. 3E is a table showing various sets of stations on each row. Each set contains 2 or more stations which will be communicated with concurrently using the discrete stream and bandwidth communication option shown for the set. Each row contains different combinations of sets for a round robin sequence of communications between the WAP and the identified stations in the WLAN. The first three rows contain a round robin sequence of sets of stations which can be serviced by two subnets. The fourth row contains a round robin sequence of sets of stations which is serviced by three subnets. Each column contains a communication option for an associated station. A single actual communication option is shown for each of stations 108A ad 106A. Three communication options 350 are shown in adjacent columns for notebook computer 110A. Three communication options 352 are shown in adjacent columns for notebook computer 110B. In the first row for example, the first concurrent communication set, e.g. the $A_{set}$ includes stations 108A and 106A which will be communicated with concurrently on the discrete bandwidth and stream count communication option identified at the column head. Station 108A will be subject to a 20 Mhz single stream downlink concurrently with a 40 MHz dual stream downlink to station 106A. Subsequently, the next communication set in this two set by two station each round robin sequence is the $B_{set}$ which includes stations 110A-B. Station 110A will be subject to an 80 Mhz dual stream downlink concurrently with an 80 MHz dual stream downlink to station 110B. Each row contains other representative round robin sequences and associated sets. The examples are by no means exhaustive. Each set and or combined round robin sequence of sets is ranked with respect to each other. Ranking criteria in an embodiment of the invention includes throughput 354 and or demand weighted throughput, a.k.a. estimated airtime 356. In an embodiment of the invention the WAP determines which sets to include in its downlink communications based on these rankings.

In another embodiment of the invention the task of determining a number of subnets and the association of stations with each, is limited to identifying whether the associated stations include two or more legacy stations, e.g. stations 106A, 108A, that do not support MU-MIMO downlinks on a single subnet. If two or more legacy stations exist, then communications with the legacy stations can be split between two or more subnets and downlinks to the legacy stations on each subnet can be effected concurrently despite the fact that these legacy stations do not support IEEE 802.11ac (Wave 2) MU-MIMO. The remaining non-legacy stations that do support MU-MIMO, e.g. stations 110A-B can be associated with either subnet since they do not require separate subnets for concurrent downlink communications. This latter approach is particularly advantageous in the embodiments of the invention shown in FIG. 5 in which the number of sub-channels allocable to a subnet may be varied on a downlink by downlink basis. Thus concurrent downlinks to legacy stations on two or more subnets with overlapping bandwidth can be accomplished by splitting the bandwidth between the subnets, while subsequent concurrent downlinks to MU-MIMO compliant stations, a.k.a. non-legacy stations, on one of the subnets can be accomplished by temporarily allocating all of the overlapping bandwidth to the one of the subnets.

Figure 4:
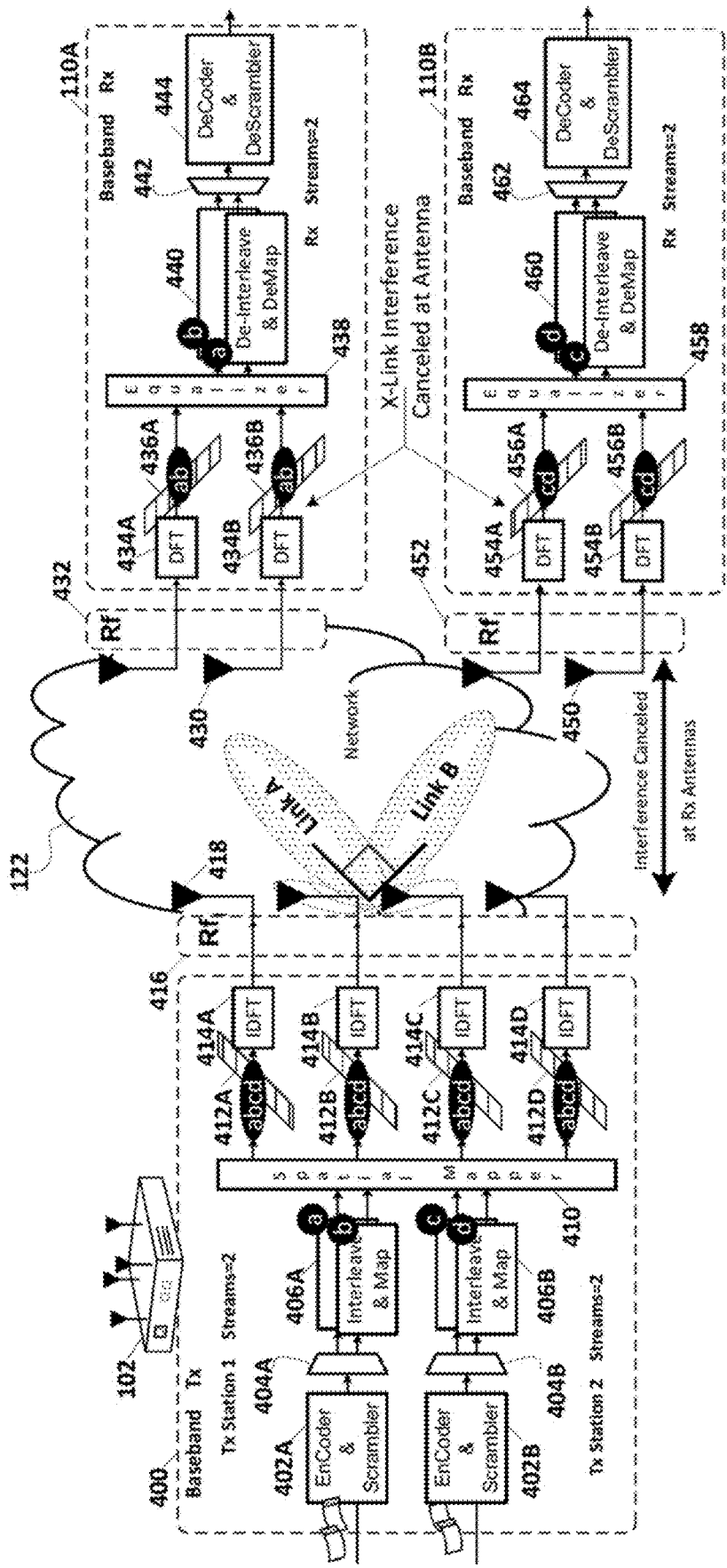
FIG. 4 is a system hardware block diagram of a Prior Art WAP and stations supporting MU MIMO wireless communications.

FIG. 4 is a system hardware block diagram of a Prior Art WAP 102 and stations supporting MU MIMO wireless communications. The WLAN stage 400 of WAP 102 is shown transmitting concurrently to an MU MIMO group comprising stations 110A and 110B. The WAP has 4 antenna 418, and each station has two antenna 430 for station 110A and 450 for station 110B. In WAP 102 communications for user/station 1109A are encoded and scrambled in encoder scrambler module 402A and de-multiplexed into two streams in demultiplexer 404A. Each stream "a", "b" is subject to interleaving and constellation mapping in an associated interleaver mapper 406A and passed to the spatial mapper 410. Communications for user/station 110B are encoded and scrambled in encoder scrambler module 402B and de-multiplexed into two streams in demultiplexer 404B. Each stream "c", "d" is subject to interleaving and constellation mapping in an associated interleaver mapper 406B and passed to the spatial mapper 410. The spatial mapper uses a preceding matrix to precede the two pairs of streams for each user so that they will arrive at their target stations antennas without interference from one another. The combined precoded streams are injected into all OFDM tones 412A-D of the four inverse discrete Fourier Transform (IDFT) modules 414A-D respectively for Radio Frequency (RF) upconversion in RF stage 216 and for transmission by each of the WAP's four antenna 418.

The signals received at the antenna 430 of station 110A are free from interference from the communications to station 110B and vice versa. In station 110A the received communications "ab" on each of the two antenna are downconverted in RF stage 432 and transformed from the time to the frequency domain in discrete Fourier Transform modules 434A-B from which they are output as discrete orthogonal frequency division multiplexed (OFDM) tones/sub-carriers/sub-channels 436A-B. All received streams are then subject to equalization in equalizer 438 implementing either linear or non-linear equalization. Received steams "ab" are subject to de-interleaving and constellation demapping in associated deinterleaver demapper modules 440, followed by multiplexing in multiplexer 442. The received data "ab" is decoded and descrambled in decoder descrambler 444.

The signals received at the antenna 450 of station 110B are also free from interference from the communications to station 11A. In station 110B the received communications "cd" on each of the two antenna are downconverted in RF stage 452 and transformed from the time to the frequency domain in discrete Fourier Transform modules 454A-B from which they are output as discrete orthogonal frequency division multiplexed (OFDM) tones/sub-carriers/sub-channels 456A-B. All received streams are then subject to equalization in equalizer 458 implementing either linear or non-linear equalization. Received steams "cd" are subject to de-interleaving and constellation demapping in associated deinterleaver demapper modules 460, followed by multiplexing in multiplexer 462. The received data "cd" is decoded and descrambled in decoder descrambler 464.

Figure 5:
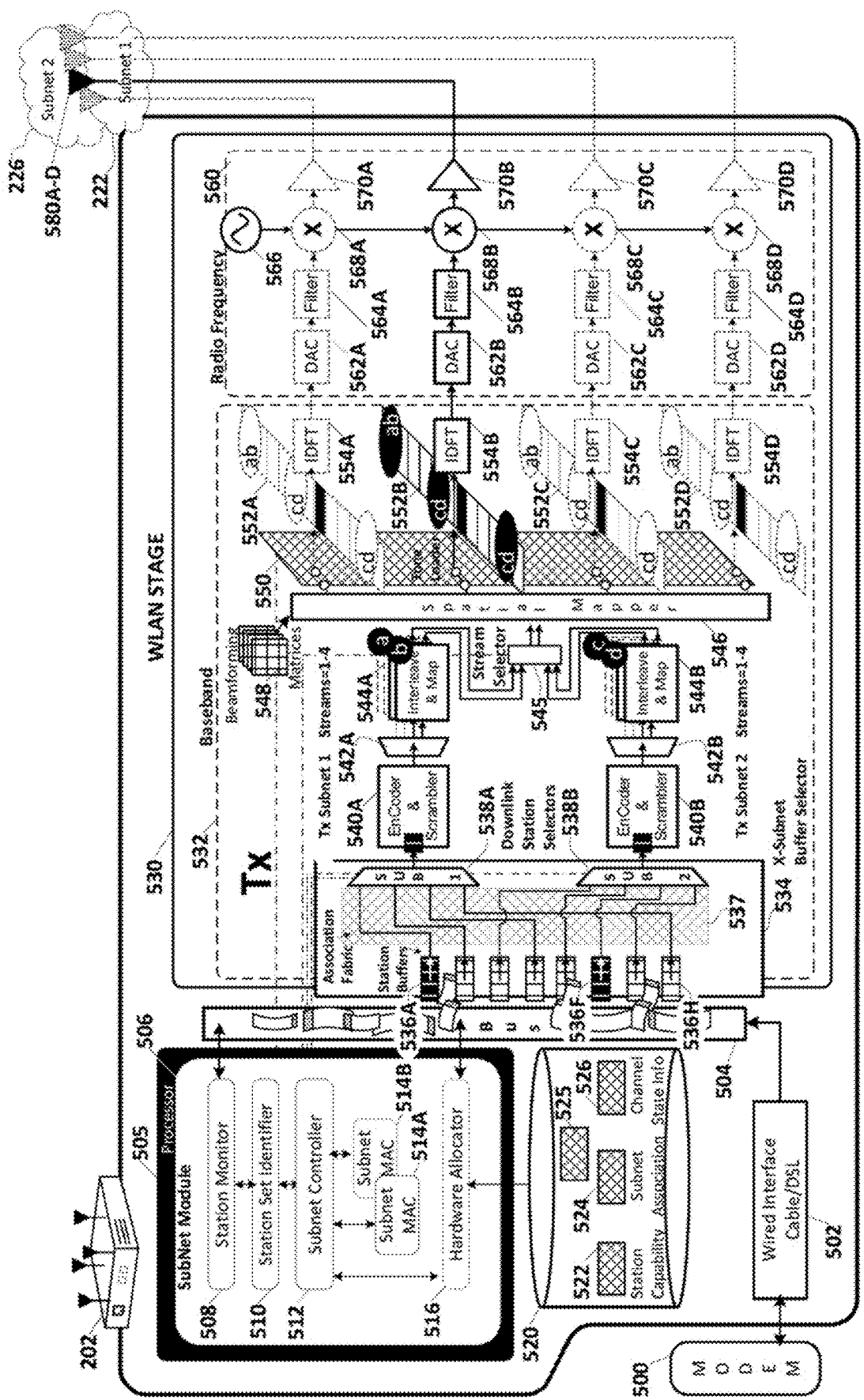
FIG. 5 is a hardware block diagram of a WAP supporting discrete communications with a station or concurrent communications with multiple stations without the requirement for either MIMO or MU-MIMO, in accordance with an embodiment of the invention.

FIG. 5 is a hardware block diagram of a WAP supporting discrete communications with a station or concurrent communications with multiple stations without the requirement for either MIMO or MU-MIMO, in accordance with an embodiment of the invention. The WAP 202 in this embodiment of the invention is identified as a 4×4 WAP supporting as many as 4 discrete communication streams over four antennas 580A-D. In this embodiment of the invention even a single antenna, i.e. 1×1 WAP would be sufficient to practice the applicant's claimed invention.

The WAP couples to the Internet via an integral wired interface 502 to a cable or digital subscriber line (DSL) modem 500. A packet bus 504 couples the modem to the WLAN wireless stage 530. The wireless stage includes a baseband module 532 and a radio frequency module 560 coupled to antennas 580A-D. In FIG. 5 only the transmit components of the baseband and RF portions of the WAP are shown. In an embodiment of the invention, the WAP however has a full and complementary set of receive path components and operates for transmitting and receiving communications from all associated wireless stations on its network. In another embodiment of the invention the WAP has fewer receive chains than transmit chains.

In the baseband portion 532 communications for each user/station are processed. Transmit processing begins with the cross-subnet buffer selector 534 which manages downlink communications to each subnet. Each station on the WLAN has its own discrete one of downlink buffers e.g. downlink buffers 536A-H. Each station and its associated downlink buffer is associated with a corresponding one of the subnets established on the WLAN. In the example shown in FIG. 5 two subnets have been established to handle a representative number of stations, e.g. eight stations, associated with the WLAN. Each subnet is associated with a distinct subset of the WLAN stations. In the example shown each subnet handles a corresponding four of the eight stations on the WLAN. In an embodiment of the invention a station association switch fabric 537 couples each downlink station buffer to a corresponding distinct one of the two subnets via a dedicated one of downlink station selector multiplexers 538A-B associated with the first and the second subnet respectively. In the embodiment shown two pairs of streams are being processed for concurrent delivery to an associated one of the stations on each of the two subnets. The baseband portion is dynamically configurable to support both discrete communications to a single station on a single subnet, and concurrent MU-MIMO downlink communications to IEEE 802.11ac (Wave2) compliant stations on a single subnet, and concurrent downlink communications to a set of two or more legacy stations each associated with a distinct one of the subnets.

In the example shown a concurrent communication on two discrete subnets 222, 226 to two stations, e.g. 108A 106A respectively, is shown. The communications "a,b" for the $1^{st}$ subnet 222 are encoded and scrambled in encoder scrambler module 540A and de-multiplexed into two streams in demultiplexer 542A. Each stream "a, b" is subject to interleaving and constellation mapping in an associated interleaver mapper 544A and passed to the spatial mapper 546 via the stream selector 545. Communications for the $2^{nd}$ subnet 226 are encoded and scrambled in encoder scrambler module 540B and de-multiplexed into two streams in demultiplexer 542B. Each stream "c, d" is subject to interleaving and constellation mapping in an associated interleaver mapper 544B and passed to the spatial mapper 546 via the stream selector 545.

The spatial mapper 546 in this embodiment of the invention precodes the streams onto the input bins of each active one of the inverse discrete Fourier transform (IDFT) modules 552A-D with several important distinctions over the prior art MIMO implementation. In the prior art MIMO implementation the spatial mapper loads downlink communications onto all input bins of the IDFT module associated with each active chain in each symbol interval. The spatial mapper in this embodiment of the invention by contrast loads, in each symbol interval, the downlink communications for each subnet only onto an associated subset of the input of the IDFT module allocated to each subnet by the subnet controller. Furthermore, the allocation of input bins can vary for each successive downlink. As shown in FIG. 26, the per tone/sub-channel input bins allocated to each subnet may vary from one packet to the next in response to changes in any one or all of: the target stations, their throughput requirements and the characteristics of the associated communication channels. The characteristics of the communication channel may include the availability or lack of availability of an entire channel or individual sub-channels thereof, due for example to interference from another WLAN.

The spatial mapper 546 in this embodiment of the invention is coupled to the input bins of each IDFT module via the tone loader switch fabric 550 which loads each spatial stream onto discrete bins of each IDFT module corresponding to the discrete bandwidth range of the beacon channel and any aggregate channels associated with the corresponding target subnet. The bandwidth range and hence the associated sub-channels/tones allocated to each subnet may vary from one packet to the next in response to changes in any one or all of: the target stations, their throughput requirements and the characteristics of the communications associated with each downlink. The spatial mapper 546 in this embodiment of the invention spatially maps downlink communications discretely onto each sub-channel/tone associated with each subnet using a corresponding one of the beamforming matrices 548. The stream selector 545 selects the appropriate streams for the subnet associated with the next tone/sub-channel. The spatial mapper uses the associated one of the beamforming matrices 548 for the subject tone to precode the associated stream(s) thereof. The tone loader switch fabric 550 then loads the preceded stream(s) onto the designated input bin of the inverse discrete Fourier Transform (IDFT) modules 552A-D associated with each active transmit chain. The process is repeated across all tones until all tones have been loaded with the allocated one(s) of the streams.

Thus, in the example shown in FIG. 5, spatially mapped streams labeled "ab" destined for subnet 222 and station 108A are loaded into only those IDFT input bins 552A-D associated with the discrete bandwidth range of the beacon/primary channel and any aggregate channels associated with the corresponding target subnet 222 for that downlink. Further spatially mapped streams labeled "cd" destined for subnet 226 and station 110B are loaded into only these IDFT input bins 552A-D associated with the discrete bandwidth range of the beacon channel and any aggregate channels associated with the corresponding target subnet 226 for that downlink. The precoded streams are kept separate in the input tone bins 552A-D of each IDFT module 554A-D. The four inverse discrete Fourier Transform (IDFT) modules 554A-D transform these separate streams from the frequency to the time domain for upconversion in Radio Frequency (RF) stage 560 and for transmission by each of the WAP's four antenna 580A-D.

The RF stage includes 4 transmit chains each with their own digital-to-analog converter (DAC) 562A-D, filter 564-D, upconverter 568A-D and power amplifier 570A-D. Each of the four transmit chains couples to a corresponding one of the WAP's four antenna 580A-D. A common oscillator 566 drives the upconverters 568A-D. Each subnet is serviced by all of the WAPs antenna 580A-D.

In an embodiment of the invention three of the output chains are shown with dashed lines. This indicates that this embodiment of the invention can be practiced with MIMO support over all antennas and associated transmit chains or without WINO support, on a single input single output (SISO) WAP over a single antenna and associated single chain, provided only that the X-subnet buffer selector, stream selector, and tone loader perform the critical function of loading the separate downlink streams onto discrete input bins of the IDFT of a single active transmit chain, e.g. the input bins 552B of IDFT 554B.

The WAP 202 also includes a subnet module 506 coupled to storage 520. In an embodiment of the invention the subnet module may be instantiated by a processor 505 running program code 525 stored in memory element 520. The subnet module includes: a station monitor 508, a station set identifier 510, a subnet controller 512 with associated subnet medium access control (MAC) modules 514A-B and a hardware allocator 516. In operation the station monitor determines the capabilities of each station, the channel between the WAP and each station, and may also make a throughput rate, a.k.a. demand estimate for same. The station set identifier is configured to identify at least one set of station nodes and complementary communication options for each station in the set which facilitate concurrent communications on each subnet between the WAP and the associated stations in the set. In an embodiment of the invention the communication options include various combinations of bandwidth and number of streams available for a concurrent downlink communication with the stations in the set, as shown in FIG. 3E. In an embodiment of the invention, the station set identifier is configured to identify among the plurality of stations, any legacy stations that do not support multi-user (MU) MIMO concurrent downlinks from the WAP, and to identify a number of WLAN subnets for enabling concurrent downlinks from the WAP to the legacy stations. In an embodiment of the invention the station set identifier further identifies among the non-legacy, i.e. MU-MIMO compliant stations, any MU-MIMO compliant stations that can not practically be included in MU-MIMO downlinks, due to channel conditions, and further identifies any existing or additional subnets required to support concurrent downlinks to same. The channel conditions are determined using MU-MIMO soundings. The subnet controller is configured both to generate subnets equal in number to a number of stations in at least one set, and for each subnet an associated beacon channel discrete from the beacon channels of other subnets, together with any required aggregate channels matching each station's identified communication option and an associated medium access control. The subnet controller also controls transmission of data from the WAP to the at least two station nodes concurrently on the associated subnets, thereby supporting concurrent downlink transmissions to station nodes including those which do not support at least one of multiple-input multiple-output (MIMO) communications or multi-user (MU) MIMO communications. The subnet controller in an embodiment of the invention checks for channel availability in each subnet. Storage 520 includes station capability table 522, channel state information records 526 maintained by the station monitor 508. Storage 520 also includes the subnet association table 524 which keeps track of which stations are associated with which subnets and is managed by the station set identifier module.

The subnet controller 512 also controls the selection, by the cross-subnet buffer selector 534, of station buffers for concurrent downlinks on each subnet as well as the allocation of bandwidth to each of the concurrent downlinks by the tone loader switch fabric 550. In the example shown four stations are associated with each subnet, and each station is allocated its own downlink station buffers. The subnet controller controls the association of stations with subnets via the association switch fabric which couples station buffers to an associated one of the downlink station selector switches, e.g. 538A-B. In the example shown, buffers 536A-D and 536E-H are associated by the association switch fabric with the $1^{st}$ and $2^{nd}$ subnet respectively. The subnet controller controls the selection by downlink station selectors 538A-B of which of the station buffers associated with each subnet will be chosen for the next concurrent downlink packets. FIG. 5 shows station buffers 538A and 536F associated with the $1^{st}$ and $2^{nd}$ subnets respectively, being selected by the downlink station selectors 538A, 538B under control of the subnet controller 512. The subnet controller also controls the selection of which subnet's stream(s) to precode for each of tone or sub-channel. Stream selection is made by the stream selector 545. Tone loading is controlled by the tone loader switch fabric. Both the stream selector and the tone loader switch fabric operate under control of the subnet controller 512. In an environment where the WLAN and the subnets thereof are subject to intermittent interference from neighboring WLANs the subnet controller determines whether to transmit on one or both subnets based not only on downlink demand but also on availability or lack of availability of downlink channels. If one subnet is temporarily unavailable then communications will continue on the other subnet. Whenever both subnets are available downlink communications to legacy stations can be conducted concurrently on both subnets.

After transmission of one set of concurrent downlink packets over the required number of symbol intervals is completed the process may repeat itself with the selection of the next set of stations for concurrent downlink. The subnet controller determines the bandwidth that will be allocated to each subnet in the next downlink packet interval. Where, as is shown in FIG. 2B, the subnets have discrete primary channels and overlapping aggregate channels, the subnet controller chooses stations for downlink in a manner which maximizes use of the aggregate channels shared between the two or more subnets. For example, when the downlink to a target station on one subnet requires maximum bandwidth it will be matched with a concurrent downlink to a target station on the other subnet which requires only minimal bandwidth and vice versa. Additionally, where a downlink to a station or a set of two or more MU-MIMO compliant stations on a single subnet requires maximum bandwidth that subnet may be temporarily allocated all the bandwidth from the other subnet regardless of whether that bandwidth is overlapping or discrete.

In an embodiment of the invention the number of subnets is dynamically configurable. In another embodiment of the invention the number of subnets may be fixed at two or more. In either embodiment the subnet controller controls the selection of stations for concurrent downlink and the allocation of bandwidth to each. In an embodiment of the invention there may be a mix of discrete and concurrent downlinks on the two or more subnets without departing from the scope of the claimed invention.

Figure 6:
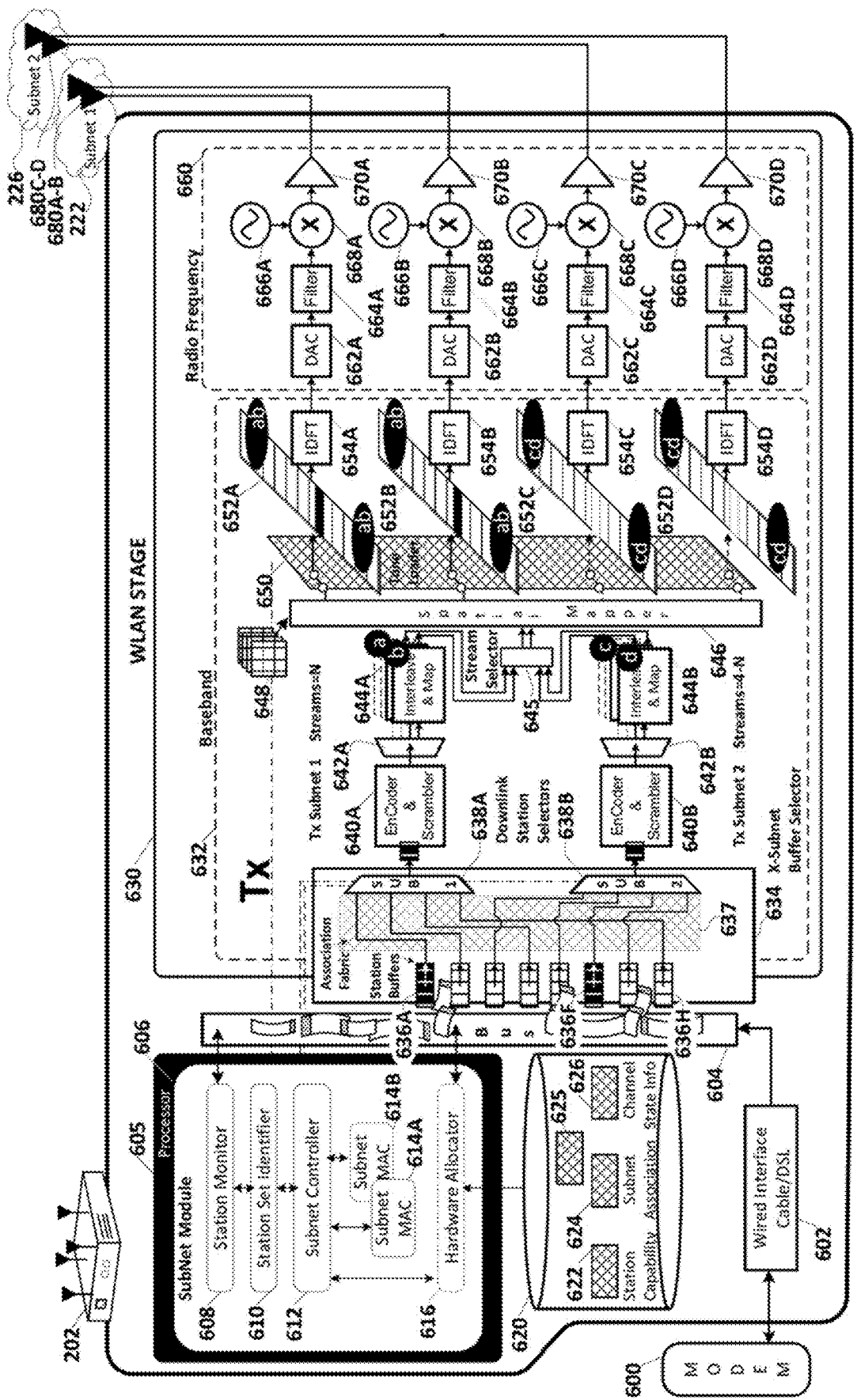
FIG. 6 is a hardware block diagram of a WAP supporting discrete communications with a station or concurrent communications with multiple stations without the requirement for MU-MIMO, in accordance with an alternate embodiment of the invention.

FIG. 6 is a hardware block diagram of a WAP supporting discrete communications with a station or concurrent communications with multiple stations without the requirement for either MIMO or MU-MIMO, in accordance with an embodiment of the invention. The WAP 202 in this embodiment of the invention is identified as a 4×4 WAP supporting as many as 4 discrete communication streams over four antennas 680A-D. In this embodiment of the invention the WAP has four Tx/Rx chains each coupled to a corresponding one of the MIMO antenna and each independently tunable to a discrete communication channel.

The WAP couples to the Internet via an integral wired interface 602 to a cable or digital subscriber line (DSL) modem 600. A packet bus 604 couples the modem to the WLAN wireless stage 630. The wireless stage includes a baseband module 632 and a radio frequency module 660 coupled to antennas 680A-D. In FIG. 6 only the transmit components of the baseband and RF portions of the WAP are shown. Baseband and RF components associated with the first chain are labeled with an "A" suffix. Baseband and RF components associated with the second chain, third chain and fourth chain are labeled with: the "B" suffix, the "C" suffix, and the "D" suffix respectively. The WAP has a full and complementary set of receive path components (not shown) and operates for transmitting and receiving communications from all associated wireless stations on its network. The baseband and RF components support modulating and demodulating WiFi communications over four discrete transmit and receive chains.

In the baseband portion 632 communications for each use/station are processed. Transmit processing begins with the cross-subnet buffer selector 634 which manages downlink communications to each subnet under control of the subnet controller 612. Each station on the WLAN has its own discrete one of downlink buffers, e.g. downlink buffers 636A-H. Each station and its associated downlink buffer is associated with a corresponding one of the subnets established on the WLAN. In the example shown in FIG. 6, two subnets have been established to handle a representative number of stations, e.g. eight stations, associated with the WLAN. Each subnet is associated with a distinct subset of the WLAN stations. In the example shown each subnet handles a corresponding four of the eight stations on the WLAN. In an embodiment of the invention a station association switch fabric 637 couples each downlink station buffer to a corresponding distinct one of the two subnets via a dedicated one of downlink station selector multiplexers 638A-B associated with the first and the second subnet respectively. In the embodiment shown two pairs of streams are being processed for concurrent delivery to an associated one of the stations on each of the two subnets. Each subnet is allocated discrete one(s) of the transmit chains. In this example, two of the four transmit chains have been allocated to the $1^{st}$ subnet 222 and the remaining two transmit chains have been allocated to the $2^{nd}$ subnet 226. The baseband portion is dynamically configurable to support both discrete communications to a single station on a single subnet, and MU-MIMO downlinks to two or more MU-MIMO compliant stations on the single subnet, and concurrent communication to a set of two or more stations each associated with a distinct one of the subnets.

In the example shown two chains have been dynamically allocated to each subnet by the subnet controller 612. This enables a concurrent communication on two discrete subnets 222, 226 to two stations, e.g. 108A, 106A respectively. Data to be transmitted is uploaded from the packet bus 604 onto a designated one of the transmit chain(s) by the cross-subnet buffer selector 634. The communications "a,b" for the $1^{st}$ subnet 222 are encoded and scrambled in encoder scrambler module 640A and de-multiplexed into two streams in demultiplexer 642A. Each stream "a, b" is subject to interleaving and constellation mapping in an associated interleaver mapper 644A and passed to the spatial mapper 646 via the stream selector 645. Communications for the $2^{nd}$ subnet are encoded and scrambled in encoder scrambler module 640B and de-multiplexed into two streams in demultiplexer 642B. Each stream "c, d" is subject to interleaving and constellation mapping in an associated interleaver mapper 644B and passed to the spatial mapper 646 via the stream selector 645. The stream selector 645, spatial mapper 646, and tone loader 650 operate under control of the subnet controller 612.

The spatial mapper in this embodiment of the invention precodes the streams selected by the stream selector 645 for each subnet onto the input bins 652A-D of whichever one(s) of the inverse discrete Fourier transform (IDFT) modules 654A-D have been allocated for that subnet. In the case of the example shown in FIG. 6, where two transmit chains are allocated to each subnet, the precoded downlink communication streams 'ab' for the target station on the $1^{st}$ subnet are loaded by the tone loader switch fabric 650 onto the input bins 652A-B of the IDFT modules 654A-B. The precoded downlink communication streams 'cd' for the target station on the $2^{nd}$ subnet are loaded by the tone loader onto the input bins 652C-D of the IDFT modules 654C-D. Each tone on each subnet is distinctly precoded by the spatial mapper 646 with the appropriate one of the beamforming matrices 648 under control of the subnet controller 612. The process is repeated until the required tones have been loaded on all of the chain. It may be the case that a particular target station does not require, or can not support, communications across all sub-channels/tones spanned by each chain, in which case the tone loader switch fabric 650 only loads a portion of the tones associated with the beacon/primary channel and any required aggregate channels for the target station on each subnet.

The precoded streams "ab" destined for the subnet 222 are kept separate from the preceded streams "cd" destined for the other subnet 226. The two inverse discrete Fourier Transform (IDFT) modules 654A-B transform streams "ab" from the frequency to the time domain for upconversion in Radio Frequency (RF) stage 660 and for transmission by two of the WAP's four antenna 660A-B to subnet 222. The remaining two IDFT modules 654C-D transform streams "cd" from the frequency to the time domain for upconversion in Radio Frequency (RF) stage 660 and for transmission by the remaining two of the WAP's four antenna 660C-D to subnet 226.

The RF stage includes 4 transmit chains each with their own digital-to-analog converter (DAC) 662A-D, filters 664-D, upconverters 668A-D and power amplifiers 670A-D. Each of the four transmit chains couples to a corresponding one of the WAP's four antenna. Each chain can transmit on its own discrete channel(s) and associated frequency range. Each chain has the same bandwidth capability. In the embodiment shown each chain has its own oscillator allowing independent selection of different channels by each chain, or allocation of more than one chain to the same communication channel(s). Oscillator 666A is shown coupled to upconverter 668A of the first transmit chain. Oscillator 666B is shown coupled to upconverter 668B of the second transmit chain. Oscillator 666C is shown coupled to upconverter 668C of the third transmit chain. Oscillator 666D is shown coupled to upconverter 668D of the fourth transmit chain. The oscillators are operative during either transmit or receive operation of the WLAN stage. In the example shown oscillators 666A-B drive their associated upconverters 668A-B respectively to the communication channel(s) selected for the $1^{st}$ subnet. Oscillators 666C-D drive their associated upconverters 668C-D respectively to the communication channel(s) selected for the $2^{nd}$ subnet.

The WAP 202 also includes a subnet module 606 coupled to storage 620. In an embodiment of the invention the subnet module may be instantiated by a processor 605 running program code 625 stored in memory element 620. The subnet module includes: a station monitor 608, a station set identifier 610, a subnet controller 612 with associated medium access controls 614A-B, and a hardware allocator 616. In operation the station monitor determines the capabilities of each station, the channel between the WAP and each station, and may also make a throughput rate, a.k.a. demand estimate for same. The station set identifier is configured to identify at least one set of station nodes and complementary communication options for each station in the set which facilitate concurrent communications between the WAP and the stations in the set. In an embodiment of the invention the communication options include various combinations of: frequency ranges, number of streams and bandwidths available for a concurrent downlink communication with the stations in the set, as shown in FIG. 3E. In an embodiment of the invention the station set identifier identifies an association of each of the plurality of stations with a corresponding one of the at least two subnets, by ranking various combinations of the plurality of stations and communication streams associated with each of the at least two subnets in terms of their ability to meet an expected downlink demand of each of the plurality of stations.

The subnet controller 612 is configured both to generate subnets equal in number to a number of stations in at least one concurrent communication set, and for each subnet an associated beacon channel discrete from the beacon channels of other subnets, together with any required aggregate channels matching each station's identified communication option and an associated medium access control. The aggregate channels may be overlapping with those of other subnets, or distinct from same depending on the embodiment of the invention. The subnet controller also controls transmission of data from the WAP to the at least two station nodes concurrently on the associated subnets, thereby supporting concurrent downlink transmissions to station nodes including those which do not support at least one of multiple-input multiple-output (MIMO) communications or multi-user (MU) MIMO communications. Storage 620 includes station capability table 622, channel state information records 626 maintained by the station monitor 608. Storage 620 also includes the subnet association table 624 which keeps track of which stations are associated with which subnets and is managed by the station set identifier module.

The subnet controller 612 also controls the selection, by the cross-subnet buffer selector 634, of station buffers for concurrent downlinks on each subnet as well as the allocation of bandwidth to each of the concurrent downlinks by the tone loader switch fabric 650. In the example shown four stations are associated with each subnet, and each station is allocated its own downlink station buffers. The subnet controller controls the association of stations with subnets via the association switch fabric which couples station buffers to an associated one of the downlink station selector switches, e.g. 638A-B. In the example shown, buffers 636A-D end 636E-H are associated by the association switch fabric with the $1^{st}$ and $2^{nd}$ subnet respectively. The subnet controller controls the selection by downlink station selectors 638A-B of which of the station buffers associated with each subnet will be chosen for the next concurrent downlink packets. FIG. 6 shows station buffers 636A and 636F associated with the $1^{st}$ and $2^{nd}$ subnets respectively, being selected by the downlink station selectors 638A, 638B under control of the subnet controller 612. The subnet controller also controls the selection of which subnet's stream(s) to precode for each chain. Stream selection is made by the stream selector 645. Tone loading is controlled by the tone loader switch fabric. Both the stream selector and the tone loader switch fabric operate under control of the subnet controller 612.

After transmission of one set of concurrent downlink packets over the required number of symbol intervals is completed the process may repeat itself with the selection of the next set of stations for concurrent downlink. The subnet controller determines the bandwidth that will be allocated to each subnet in the next downlink packet interval. Where, as is shown in FIG. 2B, the subnets have discrete primary channels and overlapping aggregate channels, the subnet controller chooses stations for downlink in a manner which maximizes use of the aggregate channels shared between the two or more subnets. For example, when the downlink to a target station on one subnet requires maximum bandwidth it will be matched with a concurrent downlink to a target station on the other subnet which requires only minimal bandwidth and vice versa. Conversely, where the subnets have distinct bandwidths that do not overlap with one another concurrent downlinks may be accomplished without a requirement for apportioning of bandwidths between subnets.

In an embodiment of the invention the number of subnets is dynamically configurable. In another embodiment of the invention the number of subnets may be fixed at two or more. In either embodiment the subnet controller controls the selection of stations for concurrent downlink and the allocation of bandwidth to each. In an embodiment of the invention there may be a mix of discrete and concurrent downlinks on the two or more subnets without departing from the scope of the claimed invention.

In FIG. 6 there each of the four chains has its own oscillator allowing upconversion to up to four distinct communication channels. In this embodiment of the invention where four subnets are formed, each subnet would be allocated a single chain. Alternately where three subnets are formed one would be allocated two chains and each of the others a single chain. Alternately, where the stations are serviced by an associated one of only two subnets the allocation of chains could be either: 4-and-0, 3-and-1, or 2-and-2 depending on the communication requirements and capabilities of the stations selected for each of the two subnets and the varying requirements of successive downlinks as determined by the subnet controller. Generally, each subnet is allocated a number of transmit and receive chains which matches either or both the capabilities and the expected demand of the stations associated therewith.

In an alternate embodiment of the invention, there may be as few as two oscillators 666 driving upconversion and downconversion of a greater number of chains without departing from the scope of the claimed invention. For example four chains may be upconverted using as few as two oscillators each switchably coupled to associated ones of the chains, and providing thereby upconversion/downconversion of the associated chain(s) to two distinct communication channels. Thus where two subnets are formed the allocation of chains could be either: 4-and-0, 3-and-1 or 2-and-2 to each subnet respectively depending on which of the chains the two oscillators are coupled to.

In an embodiment of the invention the independence of each chain in both the RF and baseband portions of the WLAN stage allows support for both concurrent downlinks and concurrent uplinks between the WAP and the associated stations of each subnet. Each subnet has its own Medium Access Control (MAC) and contention based uplinks based on Collision Sense Multiple Access (CSMA), e.g. CSMA with Collision Avoidance (CSMA-CA)

In still another embodiment of the invention where both WAP and station include the independent chains shown in FIG. 6, communications between the WAP and the station may occur concurrently on the two different subnets. This capability is of particular use when the rank of the channel between the WAP and station is low, e.g. exhibits limited multipath support and thus incapable of taking advantage of the maximum stream count supported by the WAP. In this instance the target station associated with one of the subnets, may be included in the concurrent communications on the bandwidth allocated to two or more subnets. Where for example, the channel between the WAP and the target station exhibits limited multipath support, i.e. has a rank less than or equal to 2; the WAP may downlink concurrently to the station using 2×2 antenna and stream and chain allocations on the bandwidth allocated to each of the two distinct subnets.

In still another embodiment of the invention a third subnet spanning the frequency range associated with both the first and second subnet may be added intermittently to handle communications with a station that can handle the combined bandwidth spanned by the two discrete subnets.

In another embodiment of the invention the teachings of FIG. 5 and FIG. 6 may be combined to establish subnets using both different allocated chain and within the allocated chains different allocated IDFT input bins. For example, the subnet controller may establish two or more subnets on a first set of allocated transmission chains as shown in FIG. 5 and at least one other subnet on the remaining transmit chains as shown in FIG. 6 without departing from the scope of the claimed invention.

FIG. 7 is a process flow diagram of processes associated with a WAP supporting concurrent links to stations without the requirement for MU-MIMO, in accordance with an embodiment of the current invention. Two blocks of processes 700 and 750 are shown. In processes 700 subnets are established on the WLAN and in process 750 subnet access control is set forth for both uplink and downlink.

The first process within block 700 is process 702 in which on bootup network association is initiated for at least one subnet and associated beacon channel. As each new station associates with the WLAN control returns to this block in which the association may take place on any of the existing beacon channels. Control then passes to process 704 in which the capabilities of each station are determined along with an estimate of the channel between the WAP and each station. The capabilities determination can be used to determine whether any of the associated stations are legacy stations that do not support MU-MIMO downlinks compliant with IEEE 802.11ac (Wave2) standard. Additionally, the estimate of the channel between the WAP and each station, may result in the further determination, that one of more of those stations that support MU-MIMO in theory can not in fact be part of a MU-MIMO downlink due to channel conditions. These channel conditions may result from close physical proximity between MU-MIMO devices which makes it inefficient or impractical to orthogonalize MU-MIMO downlinks to same. The channel conditions are determined using MU-MIMO soundings. Also, in an embodiment of the invention the estimated throughput requirements or demand for each station may be determined. In still another embodiment of the invention, changes in demand or throughput requirements may be dynamically detected as they change over time. Control then passes to process 706 for the identification of at least one set of stations and complementary communication options for each station in the set which facilitate concurrent communications between the WAP and the stations in the set. This process may in an embodiment of the invention may be limited to determining for the identified legacy stations the optimal number of subnets for servicing same, without compromising downlinks to non-legacy stations that do support MU-MIMO downlinks. In an embodiment of the invention any MU-MIMO compliant stations that can not practically be included in MU-MIMO downlinks, due to channel conditions, may also be separated from one another on separate subnets, so that they can be included in concurrent downlinks, albeit on separate subnets. Control then passes to process 708 in which subnets are generated equal in number to the number of stations in each set, and for each subnet a discrete beacon channel, and any required aggregate channels matching each station's identified communication option, as well as an associated medium access control (MAC) are generated. In the embodiment of the invention shown in FIG. 6 each subnet is allocated one or more of the transmit and receive chains for communications thereon as well as a distinct beacon channel and one or more distinct or overlapping aggregate channels over which to conduct the communications. The receive chains (not shown) perform the reverse operations of those shown for transmission. Control then passes to process 710 in which a IEEE 802.11 channel switch announcement (CSA) is sent to any stations that are assigned to subnets other than the initial one with which they associated with the WSLAN. The GSA is an action frame ("IEEE 802.11 Para. 8.5.2 Spectrum management Action frames") with frame format shown in FIG. 8-436 of section "8.5.2.6 Channel Switch Announcement frame format" in IEEE 802.11-2012 spec. In an embodiment of the invention the legacy stations are split between subnets thereby making them eligible for concurrent downlinks from the WAP. In another embodiment of the invention any non-legacy that support MU-MIMO but exhibit channel conditions that substantially inhibit MU-MIMO downlinks, may also be split among subnets in order to make them eligible for MU-MIMO downlinks. The splits are accomplished via the above discussed CSA from the WAP which indicates to the target station(s) the subnet(s) to which they are to move. In an embodiment of the invention the CSA can be used to match stations with subnets based on their changing demand and throughput requirements. For example, where a station's demand and throughput requirements increase, due for example to opening a video for viewing, that station can be re-associated using a CSA with a subnet that can provide it with higher throughput capability due for example to its broader bandwidth and or higher stream count. After subnets have been established control passes to process block 750 for the onset of access control on multiple subnets during downlink transmission and also during reception in each of the subnets.

The first of the processes in block 750 is a decision block 752 in which the mode of the WAP, i.e. transmit or reception is determined. In the event the WAP is in transmit mode then control passes to process 754 in which the next downlink station or set of stations identified along with associated subnets. Additionally, the transmit path components are configured to support the assigned subnets or discrete communication channel. Concurrent downlinks may be made to MU-MIMO compliant stations on a single subnet, onto legacy stations on different subnets. In an embodiment of the invention a detection of interference on one of the subnets, that renders it temporarily unavailable, results in the support for downlinks limited to remaining subnets that do not currently exhibit interference. Control then passes to process 756 in which a virtual access control indicia is injected into the transmitted packets of any non-operating subnets to prevent CSMA uplink during downlink transmission on the identified subnets. In an embodiment of the invention this comprises a NAV field. The NAV field is an information field as mentioned in IEEE 802.11 paragraph 9.3.2.4 Setting and resetting the NAV. And can be distributed in a CTS-to-self frame format as mentioned in "9.3.2.11 NAV distribution" or QoS Null frame as mentioned in "8.3.2.1 Data frame format" in IEEE 802.11-2012 spec. Next control passes to process 758 in which a virtual access control indicia is injected into the subnet downlinks to require a delayed packet receipt acknowledgement (ACK). In an embodiment of the invention the delayed ACK is accomplished via setting ACK policy subfield of QoS control field to "no Ack" as mentioned in "IEEE 802.11 Table 8-6—Ack Policy subfield in QoS Control field of QoS data frames" and "IEEE 802.11 para. 8.2.4.5 QoS Control field" of MAC header of each MAC protocol data unit f(MPDU) packet. Block Ack request frame will be sent to ask station to send Block Ack as mentioned in "8.3.1.8 BlockAckReq frame format". Control then passes to process 762 in which the downlink packet receipts are confirmed using block access requests (BAR) to prompt ordered receipt confirmation from each of the stations in the concurrent set of stations. Control then passes to decision process 780 in which a determination is made as to whether any new station is trying to associate with the WLAN. If a new station is trying to associate control returns to process blocks 700, and if not to process blocks 750.

If, alternately, in decision process 752 the mode of the WAP is switched to reception then control passes to process 770 for the identification of the next uplink station(s) and associated subnet(s) or channel(s) and the Receive components are configured. Control then passes to processes 772 in which a virtual access control indicia, e.g. a NAV field, is injected into any non-operating subnets to prevent CSMA uplink attempts during reception of packets from the identified station. Control then passes to process 774 in which a virtual access control indicia such as a clear to send (CTS) is injected into the identified operating subnet in response to a request to send (RTS) to allow the subsequent uplink(s). In the embodiment of the invention shown in FIG. 6, with independent chain(s) each coupled to an associated one of the subnets concurrent uplinks to the WAP from a station in each subnet may take place, in which case the CTS is sent to the requesting stations on each of the subnets. Next in process 776 the uplink communication is received and in process 778 the uplink packets are received. Subsequently control passes to decision process 780.

The components and processes disclosed herein may be implemented in software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless communication apparatus for providing a wireless local area network (WLAN) to a plurality of wireless stations; and the wireless communication apparatus comprising:
    a wireless access point (WAP) having:
        a plurality of antenna;
        a plurality of shared and discrete components coupled to one another to form transmit and receive chains each coupled to a corresponding one of the plurality of antenna for orthogonal frequency division multiplexed (OFDM) multiple-input multiple-output (MIMO) WLAN communications with the plurality of wireless stations;
        a station set identifier configured to identify among the plurality of wireless stations, any legacy stations that do not support multi-user (MU) MIMO concurrent downlinks from the WAP, and to identify a number of WLAN subnets for enabling concurrent downlinks from the WAP to the legacy stations; and
        a subnet controller coupled to the plurality of shared and discrete components and to the station set identifier and configured to generate the number of WLAN subnets identified by the station set identifier and for each subnet a discrete beacon channel for wireless station association and communication together with a discrete medium access control (MAC) module for collision sense multiple access (CSMA) uplinks from associated ones of the plurality of wireless stations to the WAP, and concurrent downlinks of discrete communications from the WAP including concurrent downlinks to a selected one of the legacy stations associated with a first of the subnets and to a selected other of the legacy stations associated with a second of the subnets; and
        the subnet controller configured to inject virtual access control indicia into each of the subnets to control uplinks from the legacy stations on each of the subnets to the WAP.

2. The wireless communication apparatus of claim 1, wherein the subnet controller selects a one of the subnets for a discrete uplink and transmits a virtual access control indicia on remaining ones of the subnets which prevents uplinks on remaining ones of the subnets during the discrete uplink on the selected one of the subnets.

3. The wireless communication apparatus of claim 2, wherein the virtual access control indicia comprises a 'Clear to Send' (CTS)-to-self.

4. The wireless communication apparatus of claim 1, wherein the subnet controller injects a virtual access control indicia into at least two of the subnets which enables concurrent uplinks from a first legacy station on a first of the at least two subnets to the WAP and a second legacy station on a second of the at least two subnets to the WAP concurrently with one another.

5. The wireless communication apparatus of claim 4, wherein the virtual access control indicia comprises a 'Clear to Send' (CTS).

6. A method for operating a multiple-input multiple-output (MIMO) wireless access point (WAP) having a plurality of antennas for wireless local area network (WLAN) communications with a plurality of wireless stations; and the method comprising the acts of:
    providing a plurality of transmit and receive chains each coupled to a corresponding one of the plurality of antenna for orthogonal frequency division multiplexed (OFDM) multiple-input multiple-output (MIMO) WLAN communications with the plurality of wireless stations;
    identifying among the plurality of wireless stations, any legacy stations that do not support multi-user (MU) MIMO concurrent downlinks from the WAP, and a number of WLAN subnets for enabling concurrent downlinks from the WAP to the legacy stations;
    generating the identified number of WLAN subnets and for each subnet a discrete beacon channel for wireless station association and communication together with a discrete medium access control (MAC) for collision sense multiple access (CSMA) uplinks from associated ones of the plurality of wireless stations to the WAP;
    transmitting concurrent downlinks of distinct communications from the WAP including concurrent downlinks to a selected one of the legacy stations associated with a first of the subnets and to a selected other of the legacy stations associated with a second of the subnets; and
    transmitting virtual access control indicia into each of the subnets to control uplinks from legacy stations on each of the subnets to the WAP.

7. The method for operating a WAP of claim 6, further comprising:
    selecting a one of the subnets for a discrete uplink; and
    transmitting a virtual access control indicia on remaining ones of the subnets which prevents uplinks on remaining ones of the subnets during the discrete uplink on the selected one of the subnets.

8. The method for operating a WAP of claim 7, wherein the virtual access control indicia comprises a 'Clear to Send' (CTS)-to-self.

9. The method for operating a WAP of claim 6, further comprising:
    transmitting a virtual access control indicia into at least two of the subnets which enables concurrent uplinks from a first legacy station on a first of the at least two subnets to the WAP and a second legacy station on a second of the at least two subnets to the WAP concurrently with one another; and
    receiving the concurrent uplinks from the first legacy station and the second legacy station.

10. The method for operating a WAP of claim 9, wherein the virtual access control indicia comprises a 'Clear to Send' (CTS).

* * * * *